United States Patent [19]

Krug et al.

[11] Patent Number: 4,995,910

[45] Date of Patent: Feb. 26, 1991

[54] NON-STICK COATING COMPOSITION AND METHOD FOR THERMOPLASTIC MATERIALS

[75] Inventors: James B. Krug, Pequea; Ronald S. Lenox; William J. Stewart, both of Lancaster, all of Pa.

[73] Assignee: Armstrong World Industries, Inc., Lancaster, Pa.

[21] Appl. No.: 390,173

[22] Filed: Aug. 7, 1989

Related U.S. Application Data

[60] Continuation-in-part of Ser. No. 186,913, Apr. 27, 1988, abandoned, which is a division of Ser. No. 53,897, May 26, 1987, Pat. No. 4,830,884.

[51] Int. Cl.$^5$ ................................................ C09K 3/00
[52] U.S. Cl. .................................. 106/287.32; 106/2; 106/14.21; 252/8.7; 252/353; 252/384; 428/411.1
[58] Field of Search ...................... 106/2, 14.21, 286.1, 106/287.32; 252/8.7, 353, 384; 428/411.1

[56] References Cited

U.S. PATENT DOCUMENTS

| | | | |
|---|---|---|---|
| 3,990,990 | 11/1976 | Kojima et al. | 252/384 |
| 4,169,076 | 9/1979 | Kawakami et al. | 252/558 |
| 4,170,678 | 10/1979 | Urfer et al. | 428/411.1 |
| 4,637,963 | 1/1987 | Nishimatsu et al. | 427/44 |

OTHER PUBLICATIONS

Derwent Abstract, Japanese patent no. 57008104, Jan. 16, 1982.

Primary Examiner—Mark L. Bell
Assistant Examiner—Helene Klemanski

[57] ABSTRACT

Non-stick protection can be given to the surfaces of thermoplastic material which has a tendency to become stuck to other thermoplastic surfaces during storage, especially during the heat of the summer months. By placing a film of (1) a salt selected from (a) a hydroxy alkyl sulfonate salt and (b) and alkyl sulfonate salt, and (2) an alkyl sulfate salt on the surface of the thermoplastic, sticking can be reduced or totally prevented.

18 Claims, No Drawings

NON-STICK COATING COMPOSITION AND METHOD FOR THERMOPLASTIC MATERIALS

This is a continuation-in-part of application Ser. No. 186,913 filed Apr. 27, 1988 and now abandoned which was a division of Ser. No. 053,897 filed May 26, 1987 and which issued as U.S. Pat. No. 4,830,884.

BACKGROUND OF THE INVENTION

1. Field of the Invention

A large variety of items are wholly or in part made of thermoplastic polymer materials. One disadvantage of using thermoplastic polymers develops due to the presence of thermoplastic surfaces. In particular, it has been found that when thermoplastic surfaces are placed against each other with some pressure being applied for a length of storage time, that these surfaces frequently stick together. This disadvantage is especially noted during storage in summer months or under hot conditions.

Frequently items are damaged due to this cohesion. Furthermore, difficulty is encountered in separating the thermoplastic surfaces which have stuck together. Time must be taken to apply the necessary amount of force to separate the surfaces. Frequently the force needed cannot be mustered without a great deal of difficulty.

Problems of this nature can be solved by placing materials such as sodium lauryl sulfate in a thin film on the thermoplastic surface. Such coatings, however, are disadvantageous in that many objects are thereafter wetted. Materials such as sodium lauryl sulfate will suds. Another disadvantage encountered with such materials is due to the feeling of the film composition such as sodium lauryl sulfate on the surface of the thermoplastic. To the hands, especially when moisture is present, the item will feel soapy or slimy.

It would be advantageous to provide an easily applied film for such thermoplastic surfaces to prevent or reduce the tendency of these thermoplastic surfaces to stick together. It would be further advantageous to provide a composition which would not cause sudsing or foaming when the treated thermoplastic surface comes into contact with water or when handled in the presence of moisture. It is accordingly an object of the instant invention to provide a composition and method for giving such protection.

SUMMARY OF THE INVENTION

A coating composition and the process for applying this composition to thermoplastic materials is described. The coating material reduces sticking between the thermoplastic surfaces of materials which are stored together for periods of time under pressure and especially under hot conditions. It has been found, moreover, that the instant coating material does allow the thermoplastic surfaces to be wetted by water, but no slimy feeling and no sudsing or foaming is apparent from the use of the coating material after wetting.

To prevent or at least reduce the cohesion and/or adhesion which thermoplastic objects and materials exhibit under storage conditions having close packing with some heat, the thermoplastic surface is coated with the composition consisting essentially of: (1) a salt of: (a) alkyl sulfonate and/or (b) a hydroxy alkyl sulfonate with (2) an alkyl sulfate salt and (3) a solvent.

This coating composition is applied to the thermoplastic surface and the solvent is then removed by evaporation, leaving the sulfonate salt and the alkyl sulfate salt on the surface of the thermoplastic.

Therefore, a coating system giving non-stick protection to thermoplastic polymers comprises a mixture of: (1) a member selected from the group consisting of: an alkyl sulfonate salt, a hydroxy alkyl sulfonate salt together with (2) an alkyl sulfate salt adhering to a thermoplastic surface wherein said mixture can form either: (a) a continuous coat adhering to said thermoplastic surface, whereby the thermoplastic surface is completely covered or (b) the mixture is noncontinuously adhering to the thermoplastic surface whereby some portions of the thermoplastic surface are covered and other portions of the thermoplastic surface are exposed.

The thermoplastic will be a solid macromolecular material which is capable of undergoing indefinite inelastic deformation at elevated temperatures insufficient to cause a significant amount of chemical decompositions.

The type of thermoplastic to which the coating is applied will, of course, be a material that has a tendency to stick to another thermoplastic surface when the two materials contact each other. Such "types of thermoplastics" can include uncured elastomers, partially cured elastomers, thermoplastic elastomers, and both thermoplastics and thermoplastic blends that have Tg values close to or below storage temperature, and blends of thermoplastics with cured and uncured elastomers.

Thermoplastic polymer materials and objects which have been thus coated can be stored in an abutting or contiguous manner so that the surfaces physically touch each other. The coating on these surfaces will give non-stick protection to the objects even if these objects are stored for long periods of time under hot conditions. Advantageously, moreover, this treatment deters sudsing and slipperiness if the thermoplastic is thereafter wetted.

DETAILED DESCRIPTION

The thermoplastic surfaces of materials and objects which can be given non-stick protection using the coating materials described herein includes the surfaces of all man-made polymers, including uncured elastomers and thermoplastic elastomers. The terms "thermoplastic materials" and "thermoplastic objects", when used herein, therefore includes these thermoplastic polymers, and uncured elastomers.

The thermoplastic polymers can be homopolymers, copolymers or blends of homopolymers and copolymers. The thermoplastic materials and objects will also include materials frequently found with or added to these substances (batches and mixtures). Such substances could also contain fibers, fillers, plasticizers, pigments, antioxidants etc. The objects and materials will still have the undesirable tendency to stick together after tightly packed in hot storage conditions unless given non-stick protection. The "sticking" referred to herein includes reptation, the adhesion found with different thermoplastics, and the cohesion of identical thermoplastics. This problem occurs when thermoplastic surfaces come into contact with each other.

The solution which is applied to the thermoplastic polymer surface in order to give the non-stick protection can be prepared by combining: (1) a member selected from: (a) an alkyl sulfonate salt and (b) a hydroxy alkyl sulfonate salt with (2) an alkyl sulfate salt and (3) the solvent material. The combination can be made in any order or manner. The salts are dissolved in the solvent and the solution is then ready to apply to the thermoplastic surface.

The solvent material used to prepare the solution can be any solvent materials in which the salts will dissolve. The solvent material can be a mixture of several solvents. A preferred solvent material has a low viscosity, easily wets the thermoplastic material, is readily evaporated, and should be polar. The alkali metal salts of the salts named under (1) and (2) above have been found to be particularly suitable due to their solubility in particularly suitable solvent materials.

While small amounts of particular non-polar solvents could permissibly be added to the solution, it is preferred that the non-polar solvent material in the solvent mixture used be at a maximum of 5% by weight of the total solvent material used (0-5% by weight). Acceptable polar solvents can be selected from solvent materials in the group consisting of: alcohol, water, ether, cyclic ethers, ketones, carboxylic acids, aldehydes, and polar esters. A preferred solvent mixture is water and alcohol. The most preferred solvent, however, is water. Other preferred solvents can be prepared from polar liquids selected from: water, methanol, ethanol, propanol, isopropanol, 1,4-dioxane, and tetrahydrofuran.

A mixture of polar organic solvents and water can be advantageously used. When salts are selected, so that a large alkyl group is used, having limited solubility in water, the use of polar hydrocarbon solvents in the solvent mixture will aid solubility. Solvent mixtures can also be prepared which wet the thermoplastic surface more easily than water, or which are more volatile, thereby improving evaporation and deposition of the protective salt film.

Solutions containing any effective amount of the combined sulfonate and sulfate salts will give non-stick protection to thermoplastic polymer surfaces when these solutions are applied to the thermoplastic surface and the solvent of the solution evaporated. Even solutions which are as low as 0.05% by weight of the indicated salts will give some protection to the thermoplastic polymer materials. Advantageously, moreover, by combining the sulfonate salt with the sulfate salt, the thermoplastic will not feel soapy or slippery under wet conditions. Furthermore, no foaming (sudsing) will occur.

The major purpose of the alkyl sulfate salt is to enhance the wetting ability of the solution onto the thermoplastic material. The alkyl sulfate salt should therefore be kept at a concentration equal to or less than the concentration of the sulfonate salt. This is especially true where it is desirable to avoid suds. In fact, since the particular alkyl sulfate salt will probably have a tendency to cause sudsing, it is preferred to keep the concentration of this salt less than the concentration of the sulfonate salt. The concentration ratio of the sulfonate salt to the sulfate salt which is used in the solution and which thus results in the protective coating on the surface of the thermoplastic, therefore, is at least 1:1; and preferably, the concentration ratio is greater than 1:1. An acceptable range of the concentration ratio for the sulfonate salt to the alkyl sulfate salt is from about 1:1 to about 10:1; preferably, the concentration ratio is in the range of from about 1:5:1 to 7:1. Most preferably, it is from about 2:1 to about 5:1. In some commercial applications, in fact, it is critically important to avoid suds both in applying the coating to the thermoplastic, and in the handling of the thermoplastic article. In such cases, the preferred concentration ratios are required.

The salt concentration in the solution should be at a level necessary to carry an effective amount of the combined salts to the thermoplastic polymer surface. The total combined amount of the sulfonate salts [a and b under (1)] can be used in concentrations up to 25% by weight of the total solution. An acceptable concentration range for the total amount of the sulfonate salt is from about 0.05 to about 25% by weight; a preferred concentration range is from about 0.1 to about 15% by weight; and the most preferred concentration range is from about 1.5 to about 10% by weight.

The alkyl sulfate salt acts to help wet the thermoplastic with the solution. This is accomplished by the alkyl sulfate salt at low concentrations. The concentration of this salt is therefore to be minimized in the solution. In accordance with the instant invention, effective, most desired anti-stick protection is accomplished with the sulfonate salt. Therefore, the alkyl sulfate salt is from 0.025 to 15% by weight of the solution. In fact, preferably, the alkyl sulfate salt is used at a concentration in the range of from about 0.025 to about 10% by weight of the solution. Most preferably, it is used at a concentration in the range of from 0.05 to 5% by weight of the solution.

Both the sulfonate salts and the sulfate salt which are used can be salts of any metal having the necessary solubility in the solvent. The alkali metal salts, having good overall solubility, and being readily available, are preferred.

The alkali metal of either sulfonate salts or the alkyl sulfate salt can be selected from any of the alkali metals in Group IA in the Periodic Table of Elements. The alkali metal can be lithium, sodium, potassium, rubidium, cesium, and mixtures thereof; although generally the most readily available and the preferred alkali metals to be used in either salt is lithium, sodium, potassium, or mixtures thereof. Of these the preferred are sodium and/or potassium and the most preferred is sodium.

Sulfonation techniques can be used to prepare the instant sulfonate salts. The hydroxy sulfonate salt can be prepared by sulfonating a halogenated olefin, followed by refluxing in a hydroxide and alcohol.

The sulfonate salt can be given the following structural formula:

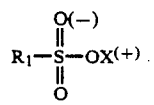

wherein x is the metal.

$R_1$ will be either a hydroxy alkyl moiety or an alkyl moiety wherein either alkyl of the hydroxy alkyl or the alkyl moiety can be selected from linear, branched, or cyclic alkyl moieties; these moieties can further be saturated, unsaturated, and aromatic hydrocarbon moieties. Acceptably, the alkyl moiety of either the hydroxy alkyl or alkyl moiety can have from 1 to 28 carbon atoms, preferably, it has from 1 to 20 carbon atoms and most preferably, from 2 to 14 carbon atoms. Preferred alkyl moieties can be selected from the group consisting of: ethyl, propyl, isopropyl, butyl, isobutyl, isopentyl, pentyl, cyclopentyl, hexyl, cyclohexyl, phenyl, benzyl, and naphthyl moieties. The phenyl, benzyl, and naphthyl permissively can have alkyl substituents. In the hydroxy alkyl moiety, the hydroxy group can be randomly located on any of the carbon atom of the alkyl moieties. Preferred hydroxy alkyl moieties can be selected from: hydroxy ethyl, hydroxy propyl, hydroxy isopropyl, hydroxy butyl, hydroxy pentyl, hydroxy isopentyl, hydroxy isobutyl, hydroxy hexyl, hydroxy isohexyl, and phenolic and naphthalinic moieties. Permissively the phenolic and naphthalinic moiety can have alkyl substituents randomly located.

Alkyl substituents may be located on the aromatic hydrocarbon moieties of the hydroxy alkyl R1 group or of the alkyl R1 group and can be saturated or unsaturated, branched, linear, and cyclic.

The alkyl sulfate salt will have the formula:

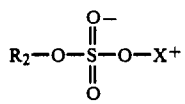

wherein x is the metal and wherein R2 can be linear, branched, or cyclic moieties. These moieties can be selected from saturated, unsaturated, and aromatic hydrocarbons groups.

Since the main function of the alkyl sulfate compound with the instant invention is to provide wetting between the thermoplastic material and the solution, R2 will acceptably have from 4 to 30 carbon atoms. Preferably, R2 has from 6 to 24 carbon atoms, and most preferably, R2 has from 8 to 18 carbon atoms.

R2 can be selected from the group consisting of: butyl, pentyl, hexyl, heptyl, octyl, dodecyl moieties and higher molecular weight homologues thereof.

When R2 is an aromatic hydrocarbon moiety, such as benzyl or naphthyl, it can have other substituent aliphatic hydrocarbon portions. In preferred applications, these non-aromatic portions of the aromatic R2 moiety will have from about 6 to about 24 carbon atoms. R2 can thus preferably be a phenyl, benzyl, or naphthyl.

The solution which is used to place the protective salt coating onto the thermoplastic polymer surface can be applied to these materials in a variety of convenient manners. Solutions can be applied to such surfaces for example, by dipping, spraying, and painting. The thermoplastic could be passed through a curtain of the solution, or even wiped with an object such as a sponge or cloth which has absorbed some of the solution. Desirably, to place the salt coating, the solution should wet the surface of the thermoplastic. Visual observation can be made when this occurs. Beading should be prevented on the surface of the thermoplastic by the alkyl sulfate salt. The presence of the sulfate salt in aqueous solutions at concentrations as low as 0.05 to 3% by weight are generally effective to prevent such beading. If, however, the thermoplastic surfaces resists wetting, the concentration of these salts can be increased. Wetting is desired so that the solution does not bead and merely run off the thermoplastic surface without depositing salt. When the solution wets the thermoplastic surface, the thermoplastic can then be dried to deposit salt.

The presence of the hydroxy alkyl sulfonate salt and/or the alkyl sulfonate salt with the alkyl sulfate salt, which remain on the thermoplastic surface will be effective to give non-stick protection to the thermoplastic. Non-stick protection can be noted on thermoplastics even when the total salt concentration in the solution is less than 1% by weight. Desirably, however, for more protection, or for thermoplastic materials to be stored under greater pressures or in increasingly hotter weather conditions, more concentrated solutions should be used. More concentrated solutions should also be used for thermoplastics which are soft and/or branched. Such soft or branched thermoplastics have a greater tendency to stick together. The branching of the molecules is especially responsible for the sticking due to the tangling or intermingling (reptation) of the molecules when their surfaces are pressed together. For such instances, a higher total salt concentration of from 4 to 40% by weight is recommended. On the other hand, two different thermoplastics which are immiscible by nature may not have much tendency to stick. For such materials, if desired, precautionary protection can be given with the more dilute solutions (0.5 to 10% by weight total salt).

Non-stick protection is provided for thermoplastics by the instant compositions even when the sulfonate salt and the sulfate salt do not form a continuous or unbroken salt coating (film or covering) on the thermoplastic material. Naturally, the non-stick protection is more effective or efficient when more of the salts and especially more of the sulfonate salt is applied, at least some protection can be noted even at the small concentrations previously indicated. While not wishing to be bound by theory, it can be noted that in all likelihood and especially with small concentrations, some non-stick protection is delivered by a single molecular layer of the salt mixture on the thermoplastic surface. In fact, for many applications, it is preferred that the salt coating not be visible to the eye or otherwise detectable to the skin. Acceptably, the amount of salt placed on the thermoplastic surface by the solution can be from about 0.0001 grams per square meter to about 2 grams per square meter after drying. A preferred range for the amount of salt placed on the thermoplastic surface is from about 0.001 to about 0.5 grams of salt per square meter.

The type of thermoplastic that is coated is characterized in that it has a tendency to stick to another thermoplastic surface when the surfaces of the two thermoplastic materials contact each other. Some thermoplastics that notably have this tendency are polymers prone to reptation, (like those having branched molecules), thermoplastic elastomers, uncured elastomers, partially cured elastomers, thermoplastics having lower glass transition temperatures (Tg), and blends of these materials. Polymers which are "soft" would fall into the category of materials with a lower Tg.

Some polymers will develop sticking problems under storage conditions. For example, if the polymers are stored under pressure or at higher temperatures sticking can occur. This is especially true if the temperatures in storage are near or in excess of the glass transition temperature of the thermoplastic. Thus, for example, if thermoplastic objects are packed together under conditions in which the temperatures are near glass transition point, getting to within about 45° C. of the Tg or even in excess of it, then the instant protective coating can effectively be used to make sure that the objects can be separated easily or without damage.

Thermoplastics having a Tg less than about 80° C. which would experience ambient temperatures could even need an effective coating. Surprisingly, as is demonstrated in Example 1, even materials that are even more prone to sticking can be protected. A coating of the instant sulfonate-sulfate combination should be made in an amount effective to reduce or eliminate the sticking between the two thermoplastic surfaces.

The instant invention can be used to give non-stick protection to the surface of thermoplastic polymers, cured elastomers, partially cured elastomers, or uncured elastomers. The thermoplastic, furthermore, can be in any shape or form. Non-stick protection can even be given to the surfaces of thermoplastic foams and foamed articles using the instant invention. Suitable surfaces are found on thermoplastic materials and objects which are shaped into objects such as pellets, cables, sheets, tubes, etc. which must be stored so that surfaces are contiguous or abutting (touching each other). Undesired sticking can especially be noted when such objects are: (1) made of soft, and/or branched thermoplastic material or (2) are under heat and pressure as, for example, at the bottom of a pile or near the center of a box, coiled cable, or roll. The instant invention can be used to reduce or eliminate sticking in such cases.

The instant invention can be used to give non-stick protection to any thermoplastic material which needs it. Acceptably, the thermoplastic surface can contain thermoplastic material can including one or more polymers selected from the group consisting of: polyolefins, halogenated polyolefins, polyesters, polyacrylates, polycarbonates, polyvinyl chloride, polyvinylidene chloride, polystyrene, polyamides, polyurethanes, and polymers derived in whole or in part from vinyl acetate monomer. The instant invention can be particularly useful to give non-stick protection to the thermoplastic surfaces of thermoplastics containing materials selected from the group consisting of: polyethylene vinyl acetate; mixtures of polypropylene with nitrile rubber; mixtures of polypropylene with ethylene propylene diene monomer; polyolefins (especially branched polyolefins); ethylene/propylene copolymers; chlorinated polyolefins (chlorinated polyethylene, etc.); and polymers derived from ethylene, propylene, and diene monomers (referred to as EPDM).

Other thermoplastics which can be protected include homopolymers and copolymers or blends thereof, which are derived from monomers selected from the group consisting of: vinyl acetate monomers, olefins, vinyl chloride monomers, halogenated olefins, and vinylidine chloride monomers.

The instant invention is also particularly suited for use in combination with thermoplastic surfaces containing materials selected from the group consisting of: polyolefins; halogenated polyolefins; polyurethanes; polymers derived in whole or in part from vinyl acetate monomer and/or vinylidene chloride monomer; polyvinyl chloride; and polyvinylidene chloride. These materials are particularly noted because of the tendency of the objects made with these materials to stick together. The instant invention can be used to reduce or eliminate sticking problems with such objects.

Another very valuable application of the instant invention is to protect material such as foams and delicate objects made from thermoplastic materials which do have a tendency to stick together. Foams and delicate objects frequently have fragile surfaces. Delicate objects can include objects having thin structural members, a decorated surface, a surface design, or fine embossed detail on the surface of the object. Such objects, for example, would include tiles and floors having a design painted, laid or embossed on the surface of the object. If the thermoplastic surface of such objects stick together, they are frequently damaged when the objects are forced apart. This will occur with cohesive failure when the objects are forced apart. Surprisingly, however, the surfaces of such materials can be protected by the instant invention in order to preserve the fragile surface or the embossed design and prevent damage.

While the instant invention can be used to reduce or eliminate sticking with a variety of thermoplastic materials, the instant invention is particularly useful for reducing or eliminating sticking in thermoplastic objects which must be used in applications which require handling or wetting. The instant invention is particularly adapted for such thermoplastic objects because the instant salt coating composition which is provided will not form suds and will not result in a slippery surface on the thermoplastic when these materials are rewetted. Thus, thermoplastic materials having the instant coatings can be readily handled without a soapy feeling and these objects can be wetted and slipperiness and suds will not occur. The instant invention is therefore particularly suited for thermoplastic objects selected from: flooring and floor mats; foamed articles such as trays and tubes; covered wires and cables, plastic films, plastic wrapping material, and containers.

Examples which follow are offered to illustrate the instant invention. Since these examples are offered to illustrate the instant invention, they should not be taken to limit it. All parts and percentages are by weight unless otherwise indicated.

EXAMPLE 1

This example show a comparison between treated and non-treated samples of an uncured elastomer composition. A standard master batch composition for rubber products was prepared of the following composition:

1. acrylonitrile butadiene rubber—100 parts
2. polyvinyl chloride—62 parts
3. aluminum trihydrate—120 parts
4. antimony oxide—20 parts
5. calcium stearate—1 part
6. polyethyleneglycol—5 parts
7. hydrocarbon wax blend—5 parts
8. paraffin—1.5 parts
9. amine wax—8 parts
10. stearic acid—1.5 parts
11. titanium dioxide—1 part
12. epoxidized soybean oil—2.5 parts
13. tin stabilizer—1.5 parts
14. chlorinated paraffin plasticizer—55 parts
15. tricresyl phosphate—10 parts
16. coumarone-indene resin—5 parts
17. carbon black—6 parts
18. an organic filler (a bone and hide glue) —60 parts The above described uncured acrylonitrile butadiene rubber was cut into 12 pieces each of which measured 3"×6" by ¼". These samples were separated into Parts A and B as follows:

Part A

Three pairs of these samples were treated by wetting them with a solution that was 4% by weight in sodium 2-hydroxyethane sulfonate and 1% by weight in sodium lauryl sulfate. The 3"×6" surface of each sample pair was placed together and was put in an oven at 140° F. Weights were placed on top of each sample. One sample having a one pound weight, the second sample having a 2.5 pound weight and the last sample having a six pound weight. These samples were permitted to remain in the 140° F. oven for 72 hours. After this length of time, the samples were removed and cooled.

It was found that all of these treated samples could all be separated by a force of approximately five pounds pull.

Part B

Untreated samples having no protective non-stick coating of the same dimensions as described in (A) were placed in the same oven in the same manner as described in Part A and were permitted to remain for the same length of time. After these samples were cooled, it was found that the rubber sections had flowed together, and could not be separated with even twenty pounds of pull.

EXAMPLE 2

Part A

A solution which was 100 grams of water, 2 grams of sodium lauryl sulfate, and 5 grams of sodium 2-hydroxy ethane sulfonate (sodium isethionate) was painted onto the surface area of seven thermoplastic tubes.

All of the tubes were made of the same thermoplastic which was a vinyl acetate monomer-containing thermoplastic polymer. Six of the tubes were of the same length, and the seventh tube was 1½ inches longer than the other six. The tubes were allowed to air-dry separately.

After drying the treated tubes were forced into a cylinder and packed so that the longest tube was in the center pressing against all of the six other tubes which, in turn, pressed against the inside surface of the cylinder. It was intended that this manner of packing the cylinder would simulate the type of packing encountered when such items are packed in a box.

The cylinder containing the tubes was then placed in a 140° F. oven for three days. The cylinder was then removed, allowed to cool, and a one kilogram (Kg) full scale force gauge was attached to the center tube and the center tube was removed.

The force required to start movement of the center tube was measured at 0.8 Kg and the force to maintain movement of this tube was measured at 0.4 Kg. There was no tearing of the tubes themselves.

Part B

The same equipment and procedure as described in Part A was used in this experiment except that the tubes were not treated with any solution. In this instance, when force was applied to the middle tube to try to pull it from the cylinder, it was found that the tubes were sticking to each other and it was not possible to loosen the center tube.

When enough force was used to pull the center tube loose and remove it from the cylinder, cohesive failure (tearing) of the thermoplastic material itself occured. (Cohesive failure is understood to be bond failure in which the material itself, located below the surface, i.e. tears or splits, ruptures.) Because of the cohesive failure of the tube, the surface of the thermoplastic was damaged.

EXAMPLE 3

Part A

A solution was prepared which was 100 grams of water, 1 gram of sodium lauryl sulfate, and 4 grams of sodium paratoluene sulfinate. The solution was painted onto the surface of seven thermoplastic tubes identical to the tubes of Example 2, Part A. The procedure of Example 2, Part A, was followed. After storage, it is noted that the thermoplastic tube in the center was easily removed from the container using the one Kg full scale force gauge. The force required to start movement of the center tube was measured at 0.8 Kg and the force required to maintain movement was 0.4 Kg. There was no tearing of the tubes.

Part B

A solution was prepared which was 100 grams of water, 1 gram of sodium lauryl sulfate, and 4 grams of sodium paratoluene sulfinate. The method described in Example 2, Part A, was also used to test this solution for non-stick protection. It was noted, however, that when the center tube was pulled with a full scale force, none of the other tubes were loosened from it.

When enough force was used to pull the center tube loose and remove it from the cylinder, cohesive failure (tearing) of the thermoplastic material itself occured. (Cohesive failure is understood to be bond failure in which the material itself, located below the surface, i.e. tears or splits, ruptures.) Because of the cohesive failure of the tube, the surface of the thermoplastic was damaged. This is detrimental to the mechanical properties of the tube.

EXAMPLE 4

A solution of 2 grams of sodium lauryl sulfate, 100 grams of water and 5 grams of sodium 2-hydroxyethane sulfonate (sodium isethionate) is prepared. The surfaces of a thermoplastic material made of polyethylene-vinylacetate can be painted with this solution and the solvent is then evaporated from the surface of the thermoplastic by drying. Another piece of polyethylenevinylacetate which has been prepared in the same manner is then placed against the surface of the first piece of polyethylenevinylacetate and the two samples are stored together in a container for an appropriate period of time such as three days. Hot storage temperatures can be induced by heating to simulate the temperatures which would be experienced in storage during summer months (from about 75 to about 140). While it should be realized that the temperature must be maintained lower than the melting temperature of the thermoplastic and must be maintained at a sufficiently low temperature so that the thermoplastic materials will not flow together as they would when softening begins, storage pressures with summer month storage temperatures are easily tolerated. The instant invention, however, will operate at even hotter temperatures and higher pressures. It should be realized that the pressure and temperature range of tolerance is somewhat dependent on the specific thermoplastic used.

After storage at hot temperatures, the container having the polyethylenevinylacetate is removed from storage and the polyethylenevinylacetate samples are easily separated without damage or tearing of the samples. The sample further can be wetted without sudsing.

EXAMPLE 5

Comparative

A solution was prepared which was 100 parts by weight of water, 1 part by weight of sodium lauryl sulfate and 4 parts by weight of tetrabutyl ammonium hydrogen sulfate. The solution was painted onto the surface of seven thermoplastic tubes identical to the tubes used in Examples 2 and 3. Six of the tubes were of the same length and the seventh tube was 1½ inches longer than the other six. The tubes were permitted to air dry separately. After they had dried, the treated tubes were forced into a cylinder and packed so that the longest tube was in the center pressing against all six of the other tubes which in turn pressed against the inside surface of the cylinder. It was intended that by this manner of packing the cylinder would simulate the type of packing which was encountered when the items were packed in a box. The cylinder containing the tubes was then placed in an oven at 140° F. for three days. The cylinder was then removed, allowed to cool and an attempt was made to remove the center tube.

In this case, the coating of sodium lauryl sulfate and tetrabutylammonium hydrogen sulfate failed to protect the tubes from sticking together. In fact, they stuck to each other so badly that when pulling force was increased to separate the tubes, there was cohesive failure of the tube. In contrast to this, however, Examples 2A and 3A show and describe compositions that gave effective protection under the identical conditions.

COMMENT

Although certain of the sulfate and sulfonate compounds described herein for an anti-stick coating on thermoplastic might be recognized as being suitable for other uses, such as surfactants or anti-stats, it must be emphasized that random selections and combinations of materials such as surfactants and anti-stats cannot be expected to be able to act as the anti-stick coating on the thermoplastics. Examples 3 and 5, in fact, demonstrate this. Both of these examples show and compare similar combinations of similar compounds. Both of these examples, in fact, used sodium lauryl sulfate, one of the compounds of the instant invention, and yet the combinations failed to produce a protective, non-stick coating on the thermoplastic.

What is claimed is:

1. A coating system on a thermoplastic comprising: a mixture of (1) a salt selected from the group consisting of: (a) a hydroxy alkyl sulfonate salt and (b) an alkyl sulfonate salt and (2) an alkyl sulfate salt; said mixture being a coating on a thermoplastic surface of the thermoplastic, wherein there is a concentration ratio for the sulfonate salt of (1) to the sulfate salt of (2) of at least 1:1, and further that the said mixture is present in an amount that is effective to form a protective coat that gives non-stick protection to the thermoplastic, further providing that the thermoplastic is a material which, in storage, undesirably sticks to another thermoplastic surface.

2. The coating system of claim 1 wherein the salt selected under (1) has an alkyl moiety with from 1 to 28 carbon atoms, and wherein the sulfate salt of (2) has an alkyl moiety with from 4 to 30 carbon atoms.

3. The coating system of claim 1 wherein the salt of (a) and the salt of (b) are alkali metal salts.

4. The coating system of claim 1 wherein the salt selected under (1) is the hydroxy alkyl sulfonate salt of (a).

5. The coating system of claim 1 wherein the thermoplastic material has a characteristic selected from the group consisting of: (i) is a foam, (ii) has an embossed surface; and (iii) has a design on its surface.

6. The coating system of claim 1 wherein the thermoplastic is either (i) an uncured elastomer or (ii) a partially cured elastomer.

7. The coating of claim 1 wherein the thermoplastic is a soft thermoplastic.

8. The coating system of claim 1 wherein the thermoplastic contains branched molecules.

9. A coated thermoplastic object comprising a thermoplastic material having a surface that is coated with a mixture of (1) a salt selected from the group consisting of: (a) a hydroxy alkyl sulfonate salt and (b) an alkyl sulfonate salt and (2) an alkyl sulfate salt; wherein there is a concentration ratio for the sulfonate salt of (1) to the sulfate salt of (2) of at least 1:1, and further that the said thermoplastic material has a tendency to stick when the surface of the thermoplastic material is placed against a thermoplastic surface, and wherein further, the mixture forms a coating which is a protective coat that will be effective to reduce sticking between the thermoplastic surface and another thermoplastic.

10. The coated thermoplastic object of claim 9 wherein the thermoplastic material has a characteristic selected from the group consisting of: (i) is a foam, (ii) is embossed and (iii) has a design on the surface.

11. The coated thermoplastic object of claim 10 wherein the thermoplastic is either (i) an uncured elastomer or (ii) a partially cured elastomer.

12. The coated thermoplastic object of claim 10 wherein the thermoplastic is a soft thermoplastic.

13. The coated thermoplastic coated of claim 10 wherein the thermoplastic contains branched molecules.

14. The coated thermoplastic object of claim 10 wherein the thermoplastic material contains a polymer derived from a monomer selected from the group consisting of: vinylacetate monomer, olefin, vinylchloride monomer, halogenated olefin and vinylidine chloride monomer.

15. A coating composition for giving thermoplastic surfaces protection against adhesion to other thermoplastic surfaces consisting essentially of: a solution of a hydroxy alkyl sulfonate salt, an alkyl sulfate salt and a solvent further providing that the solution contains the salts in an amount effective to give non-stick protection to the thermoplastic polymer surface when these solutions are applied to the thermoplastic surface and the solvent of the solution is evaporated.

16. The composition of claim 15 wherein the hydroxy alkyl sulfonate salt has an alkyl moiety having from 1 to 28 carbon atoms, and wherein the sulfate salt has an alkyl moiety having from 4 to 30 carbon atoms.

17. The composition of claim 15 wherein the sulfate salt is present at a concentration of from about 0.025 to about 15% by weight of the solution and is an alkali metal salt having an alkyl moiety with from 4 to 30 carbon atoms; and wherein the sulfonate salt is present in an amount of from about 0.05 to about 25% by weight of the solution, and has an alkyl moiety with from 1 to 28 carbon atoms, further providing that there is a concentration ratio of the hydroxy alkyl sulfonate salt to the alkyl sulfate salt of at least 1:1.

18. The composition of claim 15 wherein there is a concentration ratio for the hydroxy alkyl sulfonate salt to the alkyl sulfate salt of at least 1:1.

* * * * *

UNITED STATES PATENT AND TRADEMARK OFFICE
CERTIFICATE OF CORRECTION

PATENT NO. : 4,995,910

DATED : February 26, 1991

INVENTOR(S) : James B. Krug et al

It is certified that error appears in the above-identified patent and that said Letters Patent is hereby corrected as shown below:

In the Claims, at column 12, claim 11, line 27, claim 12, line 30, claim 13, line 32 and claim 14, line 35, the number "10" should read --9--.

Signed and Sealed this

Twenty-third Day of June, 1992

Attest:

DOUGLAS B. COMER

Attesting Officer

Acting Commissioner of Patents and Trademarks